United States Patent
Sekine et al.

(10) Patent No.: US 7,277,880 B1
(45) Date of Patent: Oct. 2, 2007

(54) METHOD AND APPARATUS FOR STORING AND MANAGING DATA

(75) Inventors: Hitoshi Sekine, Sunnyvale, CA (US); Junichi Ota, Palo Alto, CA (US)

(73) Assignee: Ricoh Corporation, West Caldwell, NJ (US)

( * ) Notice: Subject to any disclaimer, the term of this patent is extended or adjusted under 35 U.S.C. 154(b) by 1223 days.

(21) Appl. No.: 09/782,988

(22) Filed: Feb. 13, 2001

(51) Int. Cl.
*G06F 17/30* (2006.01)
*H04N 1/40* (2006.01)
*G06F 12/00* (2006.01)

(52) U.S. Cl. ............ 707/3; 358/444; 711/112
(58) Field of Classification Search ........ 358/444, 358/1.13, 434; 711/112, 111; 707/9, 3, 100, 707/5, 4, 200, 2, 1, 10, 102, 204, 205; 709/217, 709/209, 206, 219, 212, 229, 215, 201, 224, 709/231, 234
See application file for complete search history.

(56) References Cited

U.S. PATENT DOCUMENTS 5,502,576 A * 3/1996 Ramsay et al. ............ 358/444
6,202,124 B1 * 3/2001 Kern et al. ................. 711/112
6,408,338 B1 * 6/2002 Moon et al. ................ 709/231

OTHER PUBLICATIONS

Microsft, Computer Dictionary, Fifth Editin, pp. 574-575.*
Thiel, Thomas J., Integrated CD-ROM and WORM Optical Disk Systems on the Navy's Paperless Ship, May 1992, CD-ROM Professional v5n3, pp. 17-26.*
Microsft, Computer Dictionary, Fifth Editin, pp. 574-575, 2002.*

* cited by examiner

*Primary Examiner*—John Breene
*Assistant Examiner*—Fred I. Ehichioya
(74) *Attorney, Agent, or Firm*—Hickman Palermo Truong & Becker LLP; Edward A. Becker

(57) ABSTRACT

A method and apparatus is provided for automatically storing and managing digital data. Digital data is periodically received from a variety of sources. Example digital data include, without limitation, facsimile data, scanned document data, copier data, printer data and email data. The received digital data is automatically stored on a WORM storage device. The data stored on the WORM storage device may be automatically indexed and search queries processed against the index to locate digital data stored on the WORM storage device. Other embodiments include the use of meta data and an automatic watchdog process may be employed to periodically process search queries against the data stored on the WORM storage device.

28 Claims, 4 Drawing Sheets

METHOD AND APPARATUS FOR STORING AND MANAGING DATA

FIELD OF THE INVENTION

The invention relates generally to information management and more specifically, to a method and apparatus for automatically storing and managing data.

BACKGROUND OF THE INVENTION

More recently, there has been a need to permanently archive different types of digital data in a manner that guarantees that the archived data can be retrieved and used, but cannot be altered. Two example areas where this need exists are the medical and securities fields. In the medical field, there is a need to permanently archive various types of medical records and correspondence. In the securities field, the US Securities and Exchange Commission (SEC) has mandated that brokerages must permanently archive financial records and certain correspondence, e.g., facsimiles, between brokers and clients. In both situations, there is a need to be able to permanently archive a wide variety digital data. Examples of digital data that needs to be permanently archived include, without limitation, facsimile data, scanned document data, copier data, printer data and email data. Beyond these examples, there may be numerous other types of digital data specific to particular industries that needs to be permanently archived, such as fetal monitor data in the health care industry.

One solution to this problem has been to store digital data onto so-called Write-Once-Read-Many (WORM) storage media. Examples of WORM storage media include optical-type media, such as Compact Discs (CDs) and Digital Versatile Discs (DVDs). Typically a user uses a personal computer to move the data from the personal computer to a WORM storage device. For example, a wide variety of "writeable" CD ROM drives are available for personal computers. In this situation, a user selects particular digital data to be archived and stores the digital data to the CD ROM drive, sometimes referred to as "burning" a CD ROM. Depending upon the particular operating system used, this might involve a "drag and drop" operation, where a mouse or other pointing device is used to select the particular digital data and move it to the CD ROM device. This example illustrates a significant drawback with conventional permanent archival approaches. Namely, for each item of digital data that is to be permanently archived, direct human participation is required to complete the process. These approaches are therefore impractical in applications where large amounts of digital data need to be permanently archived.

Based on the increasing need for permanent archival of digital data, an approach for permanently archiving digital data that does not suffer from limitations in conventional approaches is highly desirable.

SUMMARY OF THE INVENTION

According to one aspect of the invention, a data storage apparatus is provided. The data storage apparatus includes an interface and a data processor. The interface is configured to receive digital data. The data processor is communicatively coupled to the interface and is configured to automatically receive digital data from the interface and cause the digital data to be stored to a write-once-read-many (WORM) storage device. In other embodiments, the data processor may be further configured to generated index data and meta data. The data processor may process one or more queries against the index data and meta data.

According to another aspect of the invention, a method is provided for storing data. The method includes the computer-implemented steps of receiving digital data to be stored and automatically causing the digital data to be stored to a write-once-read-many (WORM) storage device without human intervention. Other embodiments include generating index data and meta data and processing search queries against the index data and meta data. The results of processing queries against the indexes and meta data may be reported to a user.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention. Various aspects and embodiments of the invention are described in the following sections: (1) overview; (2) architecture overview; (3) indexing and meta data, (4) query processing; (5) watchdog processes; (6) configuring the data storage apparatus; (7) example operation; and (8) implementation mechanisms.

1. Overview

A method and apparatus is provided for automatically storing and managing digital data. Digital data is periodically received from a variety of sources. Example digital data include, without limitation, facsimile data, scanned document data, copier data, printer data and email data. The received digital data is automatically stored on a WORM storage device, without requiring human participation. The data stored on the WORM storage device may be automatically indexed and search queries may be processed against the index to locate digital data stored on the WORM storage device. Other embodiments include the use of meta data and an automatic watchdog process may be employed to periodically process search queries against the data stored on the WORM storage device.

2. Architecture Overview

Figure 1:
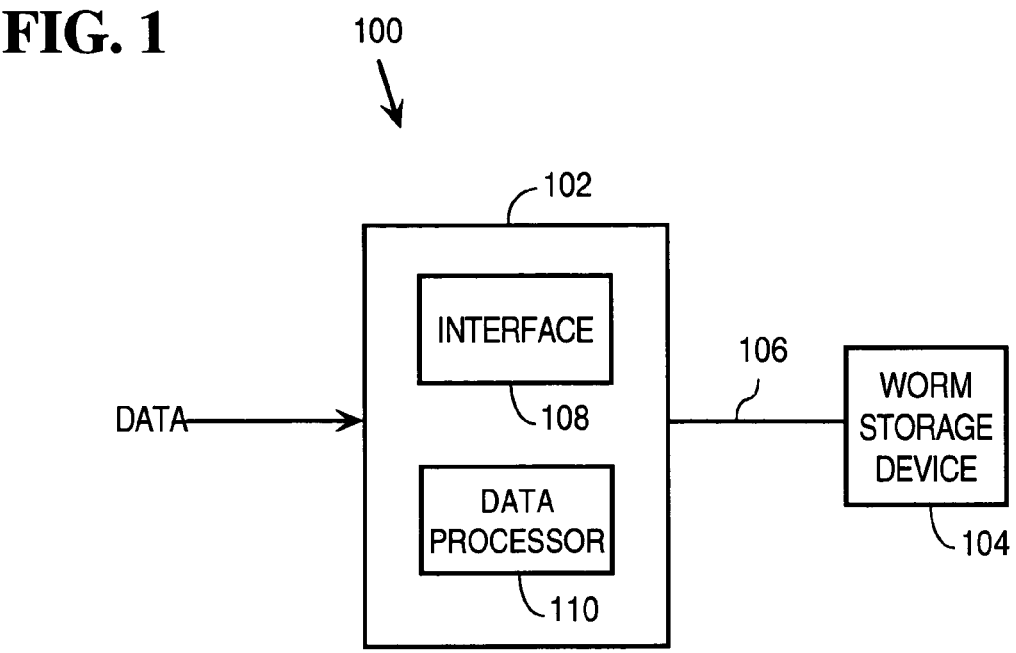
FIG. 1 is a block diagram of an arrangement for automatically storing and managing data according to an embodiment of the invention.

FIG. 1 is a block diagram of an arrangement 100 for automatically storing and managing data according to an embodiment of the invention. In arrangement 100, a data storage apparatus 102 is communicatively coupled to a WORM storage device 104 via a communications link 106. Communications link 106 may be implemented by any medium or mechanism that provides for the exchange of data between data storage apparatus 102 and WORM storage device 104. Examples of communications link 106 include, without limitation, a network such as a Local Area Network (LAN), Wide Area Network (WAN), Ethernet or the Internet, or one or more terrestrial, satellite or wireless links. Communications link 106 may be secure or unsecure, depending upon the requirements of a particular application.

In accordance with an embodiment of the invention, data storage apparatus 102 is configured to receive digital data from various sources and automatically cause the data to be stored to WORM storage device 104. Unlike conventional arrangements, where active human participation is required to store digital data to WORM devices, data storage apparatus 102 is configured to perform this function automatically, without any required human participation. Furthermore, data storage apparatus 102 is configured to automatically store any type of electronic data. Examples of digital data include, without limitation, facsimile data, scanned document data, copier data, printer data and email data.

According to one embodiment of the invention, data storage apparatus 102 includes an interface 108 and a data processor 110. Interface 108 may be implemented by any mechanism for accepting data from data sources, such as facsimile machines, printers, copiers and email clients. Examples of interface 108 include, without limitations, a network or interworking interface or card, an Internet interface and a small computer system interface (SCSI). Data processor 110 may be implemented by any mechanism for performing the functions described herein. Examples of data processor 110 include one or more processors and a data server. Data storage apparatus 102 may also include various types of local storage, such as volatile and non-volatile memory.

WORM storage device 104 may be any type of WORM device and the invention is not limited to any particular type. For example, WORM storage device 104 may be a sealed WORM device with a fixed capacity. In this situation, when one WORM device is full, then data is written to another sealed WORM device. This type of WORM device may be used, for example, in applications containing sensitive data. Another type of WORM device is one that stores data on multiple WORM optical media, such as CDs or DVDs. In this situation, data is written to one or more optical disks that are removed when full. According to one embodiment of the invention, WORM storage device 104 is configured to automatically create multiple copies of data on WORM optical media. According to another embodiment of the invention, WORM storage device 104 is configured to automatically label the WORM optical media. The labels may specify various attributes of the data stored on the WORM optical media, such as the source of the data, the format of the data, the procedure used to create the data, or any other type of information. Data may be stored on WORM storage device 104 in a compressed or uncompressed format and may be encrypted or unencrypted.

3. Indexing and Meta Data

According to one embodiment of the invention, data storage apparatus 102 is configured to generate and maintain one or more indexes of data stored on WORM storage device 104. Any type of indexing may be used and the invention is not limited to any particular type of indexing. The indexing performed by data storage apparatus 102 may be in addition to any indexing performed by WORM storage device 104. Moreover, for situations where WORM storage device 104 uses multiple storage media, such as CDs or DVDs, data storage apparatus 102 may generate and maintain a "master" index of all data stored on all of the CDs or DVDs.

According to another embodiment of the invention, data storage apparatus 102 is configured to generate meta data that describes one or more attributes of the data stored on WORM storage device 104. Any type of meta data may be generated by data storage apparatus 102 and the invention is not limited to any particular type of meta data. Examples of meta data include, without limitation, size information, storage time information, storage location, format information and encoding, encryption or compression information. The indexing performed by data storage apparatus 102 may be in addition to any indexing performed by WORM storage device 104.

4. Query Processing

Figure 2:
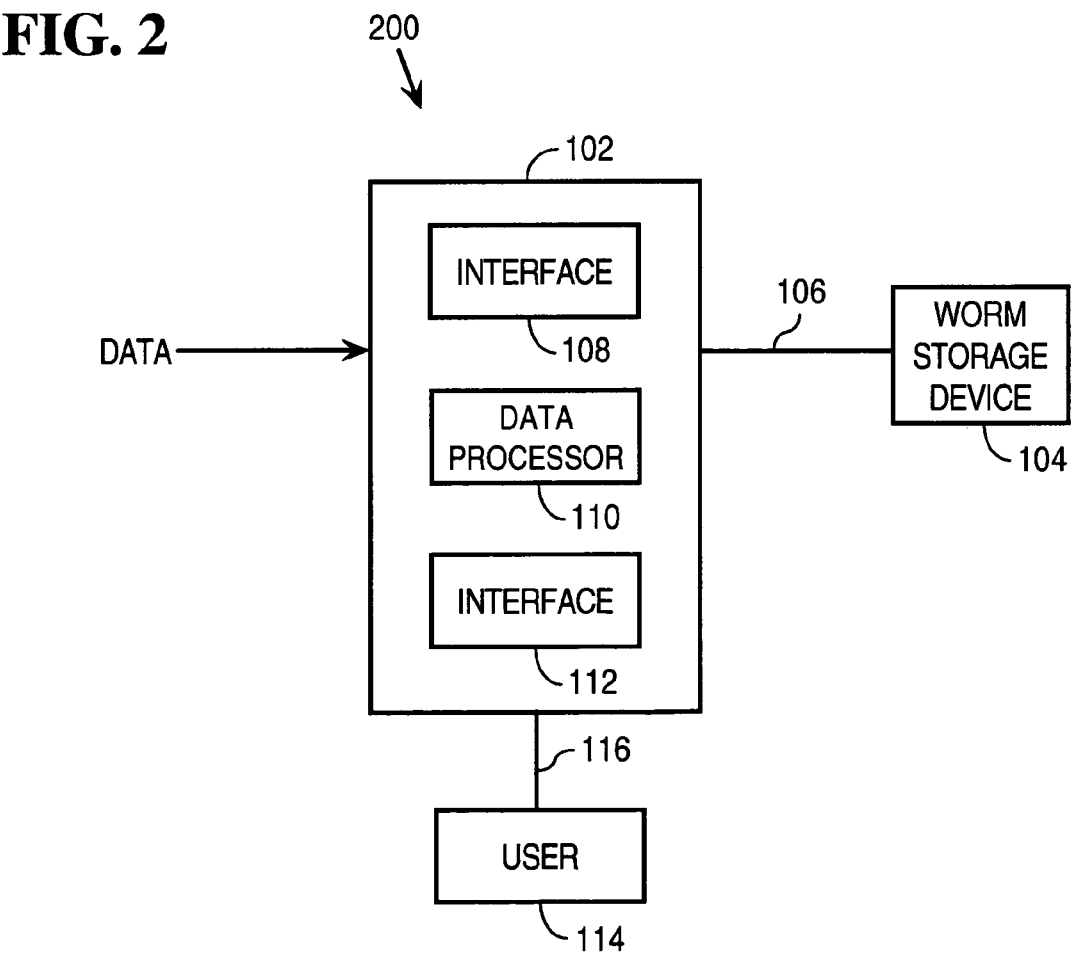
FIG. 2 is a block diagram of an arrangement for automatically storing and managing data according to another embodiment of the invention.

According to one embodiment of the invention, data storage apparatus 102 is configured to process queries against the indexes and meta data generated by data storage apparatus 102 and also generate data that indicates the results of processing the queries. FIG. 2 is a block diagram 200 of an arrangement for automatically storing and managing data according to an embodiment of the invention. In arrangement 200, data storage apparatus 102 includes an interface 112 for communicating with a user 114 over a communications link 116. As with communications link 106, communications link 116 may be implemented by any medium or mechanism that provides for the exchange of data between data storage apparatus 102 and user 114. Examples of communications link 116 include, without limitation, a network such as a Local Area Network (LAN), Wide Area Network (WAN), Ethernet or the Internet, or one or more terrestrial, satellite or wireless links. Communications link 106 may be secure or unsecure, depending upon the requirements of a particular application.

Thus, arrangement 200 allows user 114 to submit queries about data previously stored on or by WORM storage device 104. The queries are processed by data processor 110 against one or more indexes and/or meta data generated by data processor 110. Data processor 110 then generates data that indicates the results of processing the queries and provides this data to user 114 over communications link 116.

For example, suppose that data storage apparatus 102 has been used to store medical records and correspondence. In this example, user 114 submits to data storage apparatus 102 a query for any information relating to a particular patient's name. Data processor 110 processes the query and generates data that identifies any data stored on WORM storage device 104 that satisfies the query. In the present example, the data generated by data processor 110 may identify particular documents containing the particular patient's name that have been stored on WORM storage device 104. The identified documents may include, for example, facsimiles, copier documents, printed documents and scanned documents. The data may also specify other information about the data that satisfies the queries, such as the location, size and creation date of the data.

The data that identifies the data that satisfies the queries is then provided to user 114. User 114 may then request a copy of the particular data from data storage apparatus 102. For example, user 114 may be interested in a particular facsimile correspondence between the particular patient and a doctor. In this situation, user 114 requests a copy of the particular facsimile correspondence from data storage apparatus 102. In response to the request from user 114, data processor 110 retrieves and provides to user 114 a copy of the particular facsimile from WORM storage device 104. Retrieving the particular facsimile correspondence may require that one or more WORM optical media, such as CDs or DVDs, be loaded into and read by WORM storage device 104.

5. Watchdog Processes

According to one embodiment of the invention, data processor 110 acts as a "watchdog process" and automatically processes a set of one or more queries. The particular queries processed and the frequency at which the queries are processed may vary depending upon the requirements of a particular application. The particular queries to be processed and the frequency at which the queries are processed may be determined by data storage apparatus 102 using a heuristic or algorithm. Alternatively, the particular queries to be processed by data processor 110 may be specified by user 114 over communications link 116. The results of the query processing may be automatically reported to user 114.

For example, the SEC, as part of an ongoing investigation, may require that a particular brokerage entity provide, on an ongoing basis, any and all documents in its possession pertaining to a particular client of the particular brokerage entity. In this example, the particular brokerage entity, acting as user 114, would generate and provide to data storage apparatus 102 one or more queries for the particular client. Data processor 110 would periodically process the queries and automatically provide the results to the particular brokerage entity. The results might include data that identifies one or more different documents relating to the particular client, or may include the data representation of the documents.

6. Configuring the Data Storage Apparatus

According to one embodiment of the invention, user 114 may configure the functionality and attributes of data storage apparatus 102. For example, user 114 may establish a set of watchdog search criteria to be processed by data processor 110. This may include, for example, a set of queries to be processed by data processor 110, the frequency at which the queries are to be processed and the type of reporting that user 114 wants data storage apparatus 102 to provide.

According to one embodiment of the invention, user 114 communicates with data storage apparatus 102 using a generic Web browser. In this embodiment, data processor 110 generates one or more Web pages that are served to user's 114 generic Web browser over communications link 116. User 114 establishes the desired functionality and attributes by populating fields and selecting user interface objects embedded in the Web pages served by data processor 110. In this embodiment, data processor 110 may generate reports in the form of Web pages that are served to user's 114 generic Web browser. Also in this embodiment, communications link 116 supports the HTTP protocol.

7. Example Operation

Figure 3:
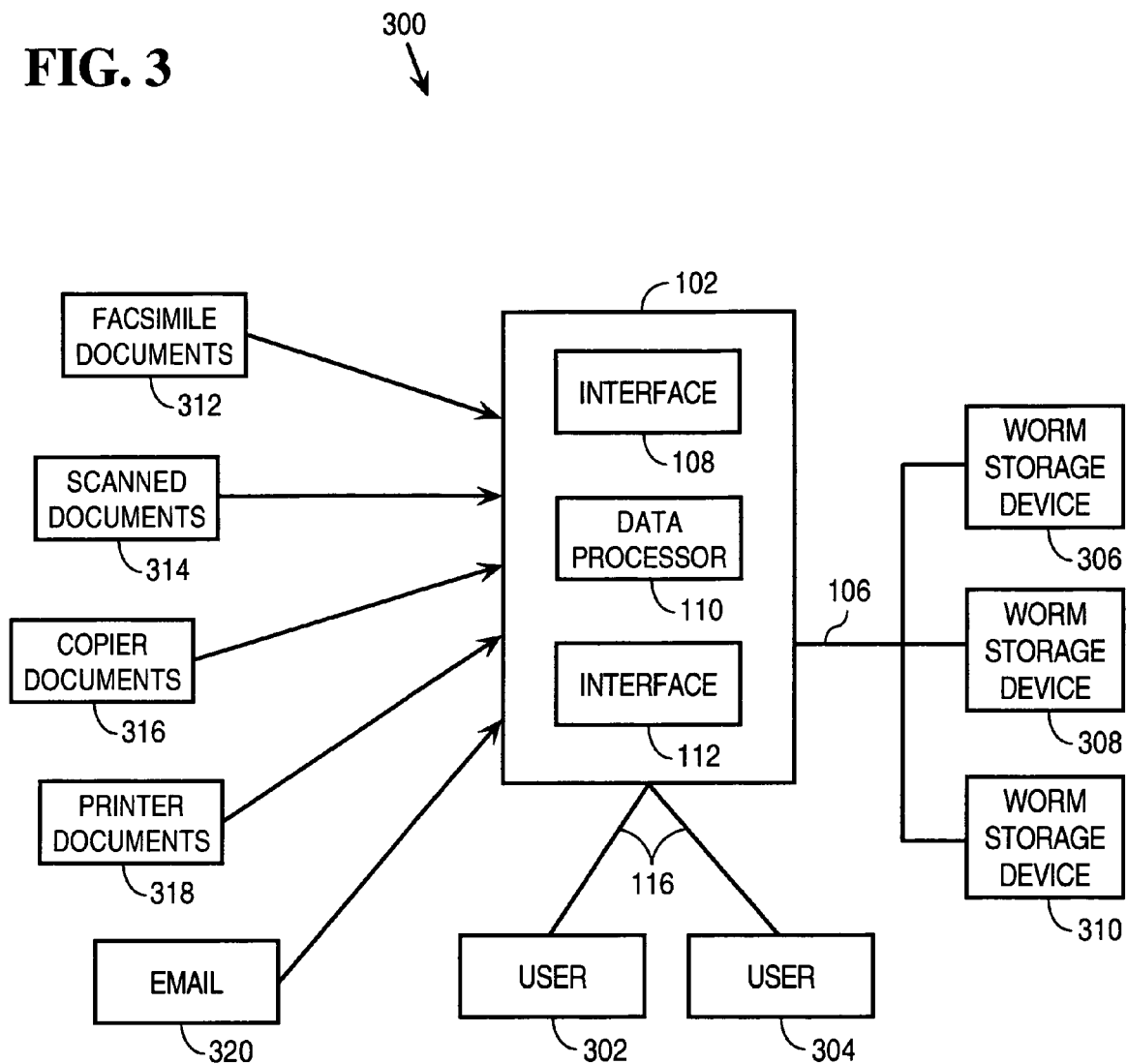
FIG. 3 is a block diagram of an arrangement for automatically storing and managing data according to yet another embodiment of the invention.
Figure 4:
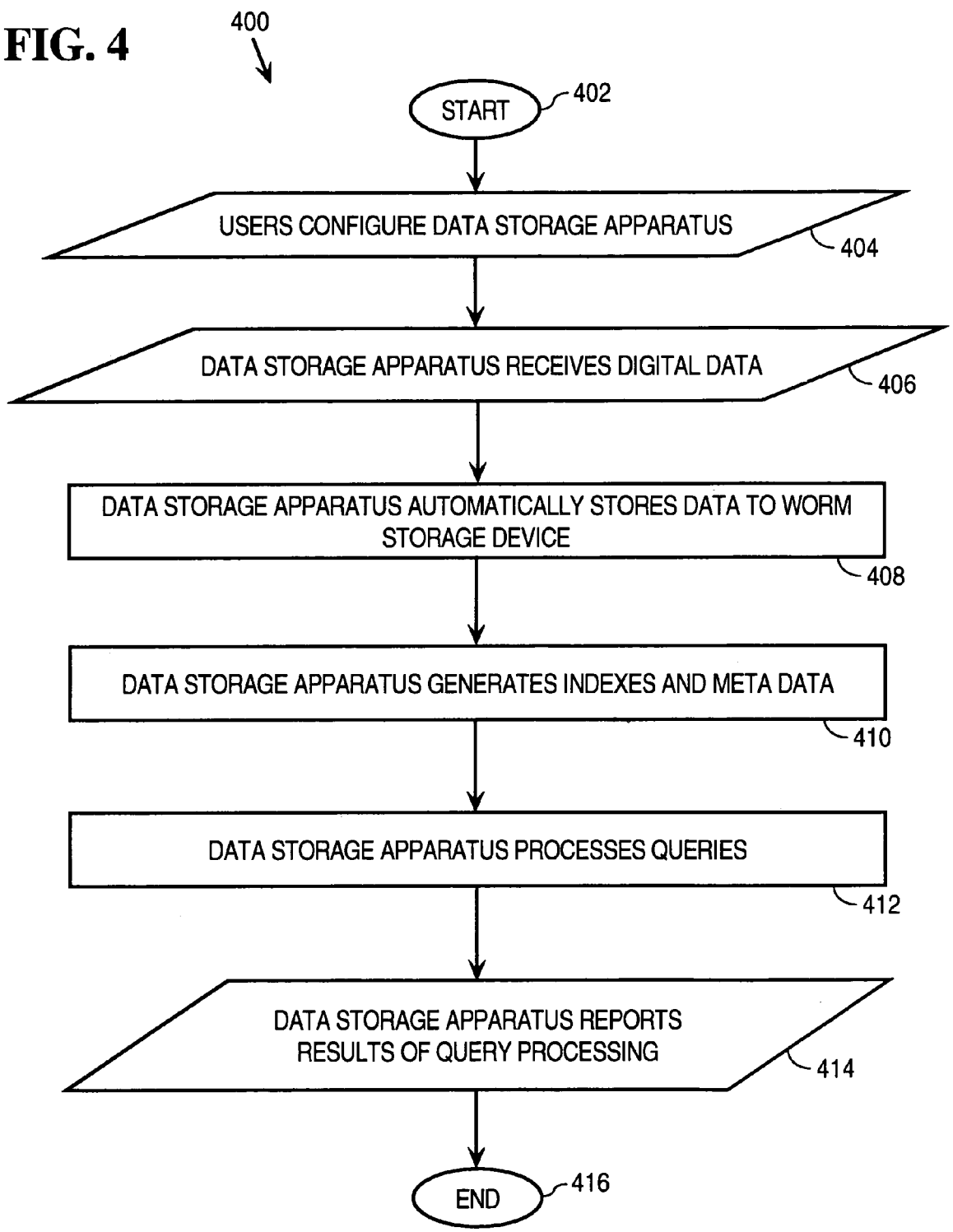
FIG. 4 is a flow diagram of an approach for automatically storing and managing data according to an embodiment of the invention.

FIG. 3 is a block diagram of an arrangement 300 and FIG. 4 is a flow diagram 400 of an approach for automatically storing and managing data according to an embodiment of the invention. In arrangement 300, data storage apparatus 102 is communicatively coupled to three WORM storage devices 306, 308, 310. Thus, the invention is applicable to any number of WORM storage devices. Also, data storage apparatus 102 is communicatively coupled to two users 302, 304. Thus, the invention is applicable to any number of users.

After starting in step 402, in step 404, users 302, 304 configure data storage apparatus 102. This may include establishing one or more search queries to be processed by data processor 110 and a schedule for processing those queries. This may also include establishing configuration data for WORM storage devices 306, 308, 310. Configuring of data storage apparatus 102 by users 302, 304 is optional and data processor 110 may use a set of default configuration data.

In step 406, data storage apparatus 102 receives data from a variety of sources. As illustrated in FIG. 3, example data includes facsimile documents 312, scanned documents 314, copier documents 316, printer documents 318 and email 320. In step 408, data storage apparatus 102 automatically stores the data to WORM storage devices 306, 308, 310. In step 410, data storage apparatus 102, generates indexes and meta data. As described herein, the particular type of indexes and meta data generated by data processor 110 may vary depending upon the requirements of a particular application an the invention is not limited to any particular types of indexes or meta data.

In step 412, data storage apparatus 102 processes one or more queries against the indexes and meta data. The particular queries to be processed may be established during configuration, or may be processed "on-the-fly," as they are received from users 302, 304. In step 414, data storage apparatus 102 reports to users 302, 304 the results of the query processing. The reporting may be performed in a variety of ways, depending upon the requirements of a particular application, and the invention is not limited to any particular approach. For example, data storage apparatus 102 may generate and send to users 302, 304 emails that specify particular electronic document that satisfy the search query. As another example, data storage apparatus 102 may retrieve and provide to users 302, 304 copies of the electronic documents that satisfy the search queries. The process is complete in step 416.

8. Implementation Mechanisms

The approach described herein for automatically storing and managing data may be implemented in a wide variety of arrangements depending upon the requirements of a particular application. For example, data storage apparatus 102 may be implemented as a stand-alone mechanism as described an implemented. Alternatively, data storage apparatus 102 and WORM storage device 104 may be integrated into a single system or device. Furthermore, the functionality of the various components of data storage apparatus 102, including interfaces 108, 112 and data processor 110, may be performed as a single mechanism, or implemented as separate mechanism as illustrated and described herein. Thus, the invention is not limited to any particular implementation. Furthermore, the approach for automatically storing and managing data may include the use of computer hardware, computer software or a combination of computer hardware and the invention is not limited to any particular implementation.

The approach described herein for storing and managing data provides numerous advantages over prior approaches. First, the approach provides for the permanent archival of a wide variety of digital data. Second, the approach is automatic and does not require human intervention to complete the permanent storage of data. Third, the approach provides for the automatic generation of index and meta data across any number of WORM optical media, e.g., CD ROMs and DVDs. Fourth, the approach provides automatic query processing against the indexes and met data, followed by automatic reporting, which can be configured to meet the requirements of a particular application.

Figure 5:
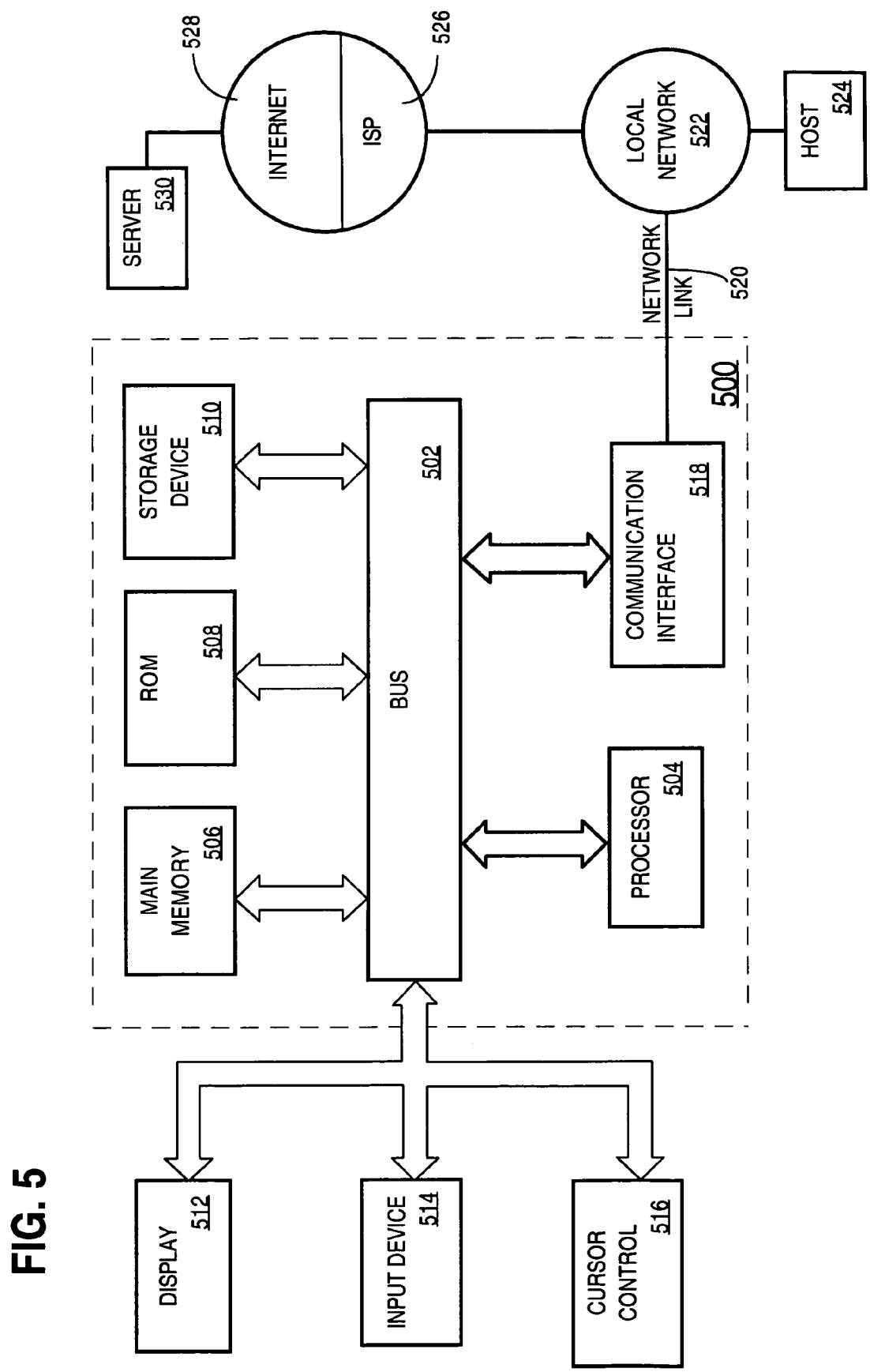
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for automatically storing and managing data. According to one embodiment of the invention, automatically storing and managing data is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for automatically storing and managing data as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data storage apparatus comprising:
   an interface configured to receive digital data; and
   a data processor communicatively coupled to the interface and being configured to:
      automatically receive digital data from the interface and cause the digital data to be stored to a write-once-read-many (WORM) storage device,
      process a search query against the digital data stored on the WORM storage device, and
      in response to processing the search query against the digital data stored on the WORM storage device, generate data that identifies data stored on the WORM storage device that satisfies the search query.

2. The apparatus as recited in claim 1, further comprising a WORM storage device.

3. The apparatus as recited in claim 1, wherein the data processor is further configured to generate one or more indexes for data stored to the WORM storage device.

4. The apparatus as recited in claim 1, wherein the data processor is further configured to generate meta data that describes one or more attributes of the data stored to the WORM storage device.

5. The apparatus as recited in claim 1, wherein the data processor is further configured to process the search query against one or more indexes generated by the data processor.

6. The apparatus as recited in claim 1, wherein the data processor is further configured to automatically process the search query according to a set of one or more time criteria.

7. The apparatus as recited in claim 1, wherein the digital data includes facsimile data.

8. The apparatus as recited in claim 1, wherein the digital data includes electronic document data.

9. The apparatus as recited in claim 1, wherein the digital data includes printer data.

10. The apparatus as recited in claim 1, wherein:
    the data is stored on an WORM optical medium, and
    the data processor is further configured to cause a label to be applied to the WORM optical medium, wherein the label specifies one or more attributes of the data.

11. A method for storing data comprising the computer-implemented steps of:
    receiving digital data to be stored;
    automatically causing the digital data to be stored to a write-once-read-many (WORM) storage device without human intervention;
    receiving a search query;
    processing the search query against the digital data stored on the WORM storage device; and
    generating data that identifies data stored on the WORM storage device that satisfies the search query.

12. The method as recited in claim 11, further comprising generating one or more indexes for data stored to the WORM storage device.

13. The method as recited in claim 11, further comprising generating meta data that describes one or more attributes of the data stored to the WORM storage device.

14. The method as recited in claim 11, further comprising processing the search query against one or more indexes.

15. The method as recited in claim 11, further comprising automatically processing the search query according to a set of one or more time criteria.

16. The method as recited in claim 11, wherein the digital data includes facsimile data.

17. The method as recited in claim 11, wherein the digital data includes electronic document data.

18. The method as recited in claim 11, wherein the digital data includes printer data.

19. The method as recited in claim 11, wherein:
    the data is stored on an WORM optical medium, and
    the method further comprises causing a label to be applied to the WORM optical medium, wherein the label specifies one or more attributes of the data.

20. A computer-readable medium carrying one or more sequences of one or more instructions for storing data, the one or more sequences of one or more instructions including instructions which, when executed by one or more processors, cause the one or more processors to perform the steps of:
    receive digital data to be stored; and
    automatically cause the digital data to be stored to a write-once-read-many (WORM) storage device without human intervention;
    receive a search query;
    process the search query against the digital data stored on the WORM storage device; and
    generate data that identifies data stored on the WORM storage device that satisfies the search query.

21. The computer-readable medium as recited in claim 20, further comprising one or more sequences of additional instructions which, when executed by the one or more processors, cause the one or more processors to generate one or more indexes for data stored to the WORM storage device.

22. The computer-readable medium as recited in claim 20, further comprising one or more sequences of additional instructions which, when executed by the one or more processors, cause the one or more processors to generate meta data that describes one or more attributes of the data stored to the WORM storage device.

23. The computer-readable medium as recited in claim 20, further comprising one or more sequences of additional instructions which, when executed by the one or more processors, cause the one or more processors to process the search query against one or more indexes.

24. The computer-readable medium as recited in claim 20, further comprising one or more sequences of additional instructions which, when executed by the one or more processors, cause the one or more processors to automatically process the search query according to a set of one or more time criteria.

25. The computer-readable medium as recited in claim 20, wherein the digital data includes facsimile data.

26. The computer-readable medium as recited in claim 20, wherein the digital data includes electronic document data.

27. The computer-readable medium as recited in claim 20, wherein the digital data includes printer data.

28. The computer-readable medium as recited in claim 20, wherein:
the data is stored on an WORM optical medium, and
the further comprising one or more sequences of additional instructions which, when executed by the one or more processors, cause the one or more processors to cause a label to be applied to the WORM optical medium, wherein the label specifies one or more attributes of the data.
n

* * * * *